Sept. 19, 1950            L. RADO            2,523,234

PROCESS FOR THE PRINTING OF PLASTICS

Filed Aug. 5, 1947

Leopold Rado
*Inventor*

Patented Sept. 19, 1950

2,523,234

UNITED STATES PATENT OFFICE 2,523,234

PROCESS FOR THE PRINTING OF PLASTICS

Leopold Rado, London, England

Application August 5, 1947, Serial No. 766,139
In Great Britain September 23, 1942

3 Claims. (Cl. 18—61)

1

This application is a continuation-in-part of my co-pending application entitled, Process for the Printing of Plastics, Serial No. 501,141, filed September 1, 1943, now abandoned, and relates to printing on the surface of molded plastic articles on which printing by ordinary methods is either difficult or impossible.

The object of the present invention is to provide a process which consists essentially in producing a negative for the print on a carrier of sheet material having a fiber-free surface, bringing the negative and plastic surface together while the plastic in the mold is hot and in softened and tacky condition and by applied pressure transferring the print to the plastic surface.

With the foregoing and other objects in view, the invention will be more fully described hereinafter and more particularly pointed out in the appended claims.

Figure 1:
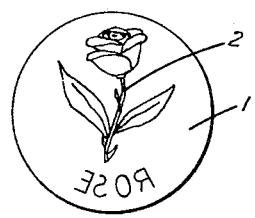
Figure 2:
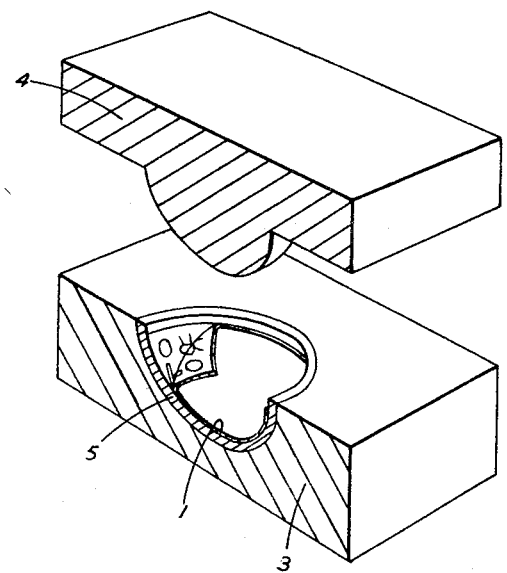

In the drawings, in which like parts are denoted by the same reference characters throughout the several views, Figure 1 is a top plan view of a circular sheet of material having a fiber-free surface on which a print is made by the use of a thermoplastic ink; and Figure 2 is a fragmentary perspective view of a molding tool as employed in the printing process of this invention.

The carrier for the print is preferably a thin metal foil 1, particularly aluminum foil, the advantage of this being that the printing can be carried out on an article of any shape because the extremely thin metal foil can adapt itself to any contour without leaving folding impressions on the plastic article.

In place of metal foils any sheet material can be used as print carrier if it has or is provided with a fiber-free surface which is not plastic at the temperature in the mold, such as fiber-free cellulose foils, coated paper, the coating of which must not be of thermoplastic nature or like materials. To make the print, an ink 2 of thermoplastic nature is used. During the transfer the thermoplastic ink will melt under the action of heat and penetrate into the plastic.

An ink of non-thermoplastic nature can also be used if the print is made on the surface of a non-thermoplastic, non-fibrous carrier, which surface is coated with a transparent thermoplastic coating of which the print is made. If such print carrier is used, the thermoplastic coating, which is practically the bearer of the print made with ordinary printing ink, will be stuck to the plastic surface during the transfer process taking

2 with it the printing ink, so that the coating and the printing will be transferred.

The transfer of the printing is to be carried out during the formation of the article in such a way that the article is formed in a mold 3 and 4 under heat and pressure; and while the plastic is still hot, soft, and in tacky condition the mold will be opened and the printed side of the bearer will be laid on the hot, soft, and tacky plastic surface 5 and the plastic 5 and print 1 are pressed together. After the completion of the forming the print bearer 1 will be removed leaving the print on the plastic surface.

If the print is to be transferred on thermoplastics, the transfer can be carried out at any time during the molding process, as under the action of heat the thermoplastic remains soft; but if thermo-setting plastics are used, the forming process must be interrupted before the article is fully cured; and while the plastic 5 is still hot, soft, and tacky, the mold will be opened and the printed side of the carrier will be laid to the plastic and the plastic 5 and print 1 pressed together until the curing process is completed, the mold then being opened and the print carrier removed.

It is possible, if the print carrier 1 is of strong material, to put the print carrier 1 in the mold 3 and 4 and to place the unformed plastic over the print, and to then form the plastic article 5 and to carry out the transfer in one and the same operation.

As an example of the above described process, the following is given.

On a sheet material 1 which has or is provided with a non-thermoplastic fiber-free surface, a print 2 is made by a thermoplastic ink. The constituents of the ink are as follows:

75% shellac
25% nitrocellulose

These are dissolved in ethyl alcohol to which a coloring substance is added.

The mold 3 and 4 is loaded with urea formaldehyde molding powder and heated to 300° F. under pressure of one ton per square inch for a period of twenty-five seconds. The mold is then opened and the print carrier placed with its printed side thereto on the plastic 5 in the mold. The printed carrier 1 carries thereon a design or the like in a thermoplastic ink 2 as above described. The mold 3 and 4 is then closed and pressure applied for the time necessary to complete curing, and thereafter the mold is opened and the article 5 is removed therefrom and the print carrier 1 removed from the article.

While I have disclosed herein the best form of the invention known to me at the present time, I desire it to be understood that I reserve the right to make changes and modifications in the herein described embodiment of the invention provided such changes fall within the scope of the following claims.

What is claimed is:

1. The herein described process for the printing of plastics during the molding process consisting of filling the mold with a heat-softenable molding powder and subjecting the same to heat of 300° F. under pressure of one ton per square inch for a period of twenty-five seconds, interrupting the molding process and placing a non-thermoplastic fiber-free surface design carrier having thereon a design of thermoplastic ink in the mold with the design facing the plastic being formed, effecting a transfer of thermoplastic ink design from the fiber-free surface design carrier to the plastic being molded by resuming the molding process and resubjecting the article being molded to heat and pressure completing simultaneously the transfer of the design and the molding of the plastic article, and subsequently stripping off the carrier from the plastic.

2. The herein described process for the printing of plastics during the molding thereof as claimed in claim 1 characterized by the fact that said thermoplastic ink is composed of 75% shellac, 25% nitrocellulose dissolved in ethyl alcohol with coloring added.

3. The herein described process for the printing of plastics during the molding process as claimed in claim 1 characterized by the fact that the plastic within the mold to which the design is to be transferred is a urea formaldehyde resin.

LEOPOLD RADO.

REFERENCES CITED

The following references are of record in the file of this patent:

UNITED STATES PATENTS

| Number | Name | Date |
| --- | --- | --- |
| 1,742,516 | Mills | Jan. 7, 1930 |
| 2,070,023 | Olsen | Feb. 9, 1937 |
| 2,250,958 | Kautter et al | July 29, 1941 |
| 2,273,700 | Feuerstein | Feb. 17, 1942 |
| 2,353,717 | Francis et al. | July 18, 1944 |